Figure 1:
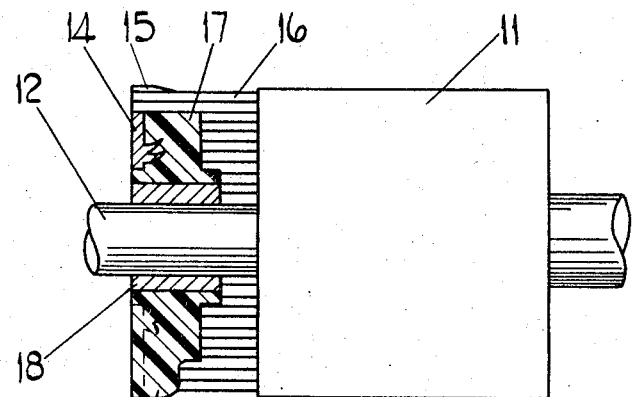
Figure 2:
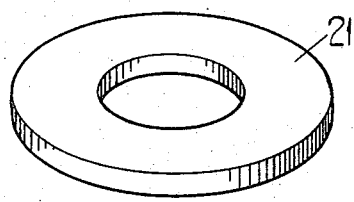
Figure 3:
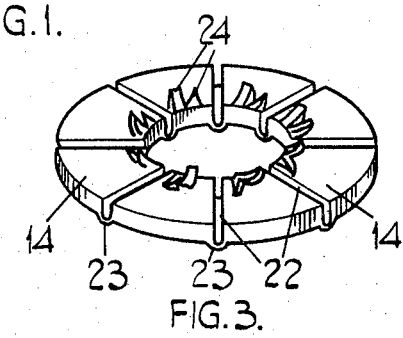

United States Patent [19]
Allen

[11] 3,861,027
[45] Jan. 21, 1975

[54] METHOD OF MANUFACTURING A ROTOR ASSEMBLY FOR A DYNAMO ELECTRIC MACHINE

[75] Inventor: Brian Robert Allen, Birmingham, England

[73] Assignee: The Lucas Electrical Company Limited, Birmingham, England

[22] Filed: Nov. 23, 1973

[21] Appl. No.: 418,217

[30] Foreign Application Priority Data
Nov. 23, 1972 Great Britain.................... 54306/72

[52] U.S. Cl..................... 29/597, 219/78, 310/234, 310/237
[51] Int. Cl............................................ H01r 43/00
[58] Field of Search...... 29/597, 598; 310/234, 235, 310/237; 219/78

[56] References Cited
UNITED STATES PATENTS

| | | | |
|---|---|---|---|
| 3,368,054 | 2/1968 | Brunner................................ | 219/78 |
| 3,568,309 | 3/1971 | Preece.................................. | 29/597 |
| 3,593,052 | 7/1971 | Hoffman............................... | 310/234 |
| 3,781,981 | 1/1974 | Miura et al. .......................... | 29/597 |

FOREIGN PATENTS OR APPLICATIONS 911,287   5/1954   Germany........................... 310/234

*Primary Examiner*—Carl E. Hall
*Attorney, Agent, or Firm*—Holman & Stern

[57] ABSTRACT

This invention relates to a method of manufacturing a rotor assembly for a dynamo electric machine.

The method comprises the steps of stamping an annular conductive disc to produce in one face thereof a plurality of angularly spaced, generally radial grooves having a depth greater than the thickness of the disc so that corresponding ribs are formed on the other face of the disc, moulding an insulating body on said one face of the disc so that the grooves are filled with insulating material, forming a slot in each of the conductive segments defined between pairs of adjacent grooves, engaging one end of at least one of a respective pair of rotor windings of the dynamo electric machine in each of the slots in the conductive segments, resistance joining the ends of the rotor windings received in the slots of at least two conductive segments to their respective segments by engaging an electrode with each of said segments and/or at least one of the windings in each of said slots and passing an electric current between the electrodes through the windings, the segments and the respective rib or ribs defined between the segments, and machining said other face of the disc to remove the ribs and thereby separate the conductive segments from one another.

7 Claims, 7 Drawing Figures

PATENTED JAN 21 1975

3,861,027

SHEET 1 OF 2

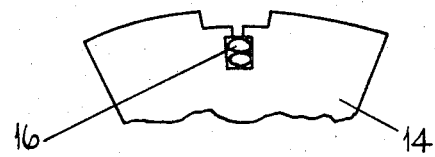
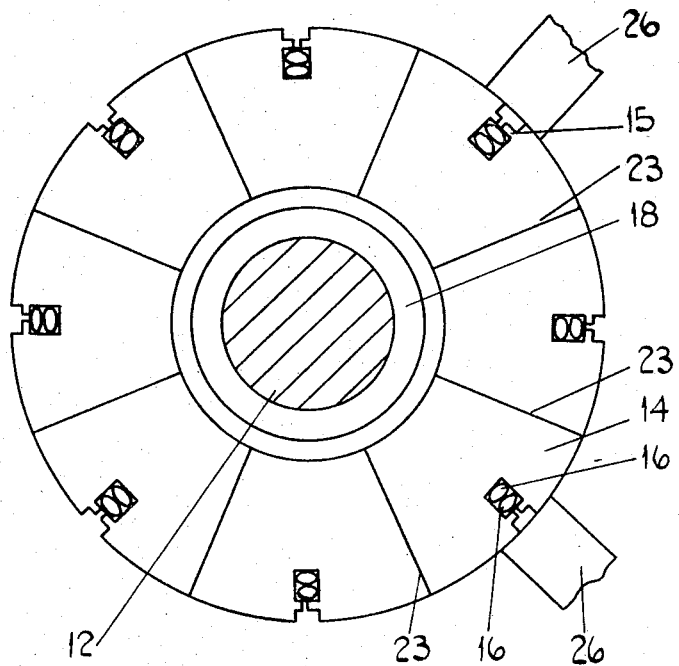

METHOD OF MANUFACTURING A ROTOR ASSEMBLY FOR A DYNAMO ELECTRIC MACHINE

This invention relates to a method of manufacturing a rotor assembly for a dynamo electric machine and particularly, but not exclusively for a road vehicle starter motor.

A method, according to the invention, comprises the steps of:
a. stamping an annular conductive disc to produce in one face thereof a plurality of angularly spaced, generally radial grooves having a depth greater than the thickness of the disc so that corresponding ribs are formed on the other face of the disc,
b. moulding an insulating body on said one face of the disc so that the grooves are filled with insulating material,
c. forming a slot in each of the conductive segments defined between pairs of adjacent grooves,
d. engaging one end of at least one of a respective pair of rotor windings of the dynamo electric machine in each of the slots in the conductive segments,
e. resistance joining the ends of the rotor windings received in the slots of at least two conductive segments to their respective segments by engaging an electrode with each of said segments and/or at least one of the windings in each of said slots and passing an electric current between the electrodes through the windings, the segments and the respective rib or ribs defined between the segments, and
f. machining said other face of the disc to remove said ribs and thereby separate the conductive segments from one another.

Preferably, where the electrodes contact the conductive segments without contacting at least one of the windings in each of the slots, the windings are located against movement in the slots prior to the resistance joining operation.

Conveniently, the windings are located against movement in the slots by deformation of the walls of the slots to key the windings in position.

Preferably, step (b) is performed before steps (c), (d), (e) and (f), although alternatively step (b) can be performed after steps (c), (d), and (e) but of course, before step (f).

Conveniently, the resistance joining operation is performed successively for each set of at least two conductive segments, or alternatively is performed simultaneously for all of the segments.

In the accompanying drawings,

FIG. 1 is a part-sectional side view of a rotor assembly manufactured by a method according to one example of the invention, FIGS. 2 to 5 are perspective views illustrating four stages respectively during the method of manufacturing the rotor assembly shown in FIG. 1, and FIGS. 6 and 7 are a sectional view illustrating two further stages respectively of the method.

Referring initially to FIG. 1, the rotor assembly includes a laminated rotor body 11 mounted on a rotor shaft 12. Supported on the shaft 12 adjacent one end of the rotor 11 is a commutator 13 which comprises a plurality of copper segments 14. Each segment 14 is formed adjacent the periphery of the commutator with a generally radially extending slot 15 and engaged in each slot are the ends of a respective pair of windings 16 carried by the rotor 11. An insulating moulding 17 carries the segments 14 of the commutator and insulates the segments from each other, the moulding 17 also supporting a sleeve 18 which, in use, is received as an interference fit on the shaft 12 to mount the commutator on the shaft.

Figure 4:
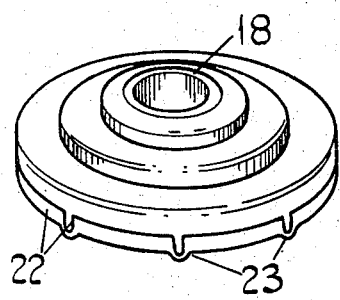
Figure 5:
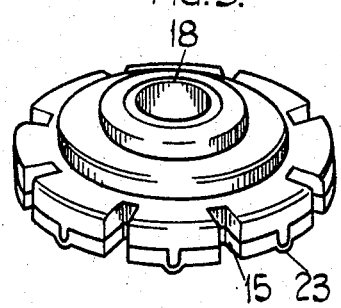

Referring now to FIGS. 2 to 7, in manufacturing the rotor assembly shown in FIG. 1, an annular copper disc 21 is first stamped (FIG. 2) to produce in one surface thereof a plurality of radial grooves 22 (FIG. 3) which divide the disc into the segments 14. The grooves 22 are greater in depth than the thickness of the disc, the material displaced from the grooves forming ribs 23 on the other side of the disc. Each segment is then formed on said one surface thereof with a pair of upstanding lugs 24, whereafter the disc is positioned in a mould together with the sleeve 18 and synthetic resin is injected into the mould. The synthetic resin enters between the disc 14 and sleeve 18 to insulate the disc from the sleeve and further fills the grooves 22 (FIG. 4). The lugs 24 act as anchorages for the synthetic resin moulding 17 thus produced.

Each segment 14 is then formed in its periphery with the generally radially extending slot 15, the radial depth of each slot being between 0.2 inch and 0.22 inch and the width of each slot being 0.105 inch. The commutator assembly thus produced is then positioned on the rotor shaft 12 so that one end of each of a pair of the windings 16 carried by the rotor 11 is received in each of the slots 15, the windings being arranged one above the other in each slot. In the particular example, the commutator has a diameter of approximately 2 ¼ inches and a thickness of 0.13 inch and each segment 14 subtends at the periphery of the commutator an arc of length along the chord of 0.2 inch. Moreover, each winding 16 is defined by a copper conductor which is of circular cross section and is surrounded by an insulating sheath so as to have an external diameter of 0.091 inch. A punch is then used to peen the edges of the slots (FIG. 6) and thereby locate the windings against movements in the slots, whereafter a 3/16th inch diameter, thoriated tungsten electrode 26 is engaged with the peened faces of each of a pair of alternate segments 14 (FIG. 7). Then, since the segments are physically and electrically interconnected by the ribs 23, current can be passed between the electrodes to soften the area of the segments adjacent the electrodes together with the windings 16 contained therein and also remove the insulating sheaths from the windings. The electrodes are thereby able to further deform the segments and form a joint between the windings and their respective segments. In the particular example the required joint is effected by passing a current of 10,000 amps through the electrode 16 for 13 cycles and by pressing each electrode against its associated segment with a force of 350 lb.

The above procedure is then repeated successively for each of the segments 14 until all the windings are electrically connected to their respective segments. Alternatively, respective pairs of welding electrodes 26 can be engaged simultaneously with adjacent segments 14 so as to permit the electrical connections to a number of pairs of the conductive segments 14 or to all of the segments to be produced in a single operation. As a further alternative, it is possible to operate simultaneously one or more sets of three electrodes by the use of a suitable three-phase supply.

After joining the leads 16 to their respective segments 14, said other face of the disc 21 is machined to remove the ribs 23 and thereby isolate the segments 14 from each other.

It is to be appreciated that, although in the example described above the windings are joining to their respective segments by deforming the metal of the segments around the windings to effect a mechanical joint, normally referred to as a hot-staked joint, it is also possible to produce the required electrical connections by resistance brazing or resistance welding. Using the latter techniques, each pair of windings would be sandwiched between its respective segment 14 and an electrode 26, possibly after plating of the windings. Then current would be passed through the windings to effect the required joint.

Further, it is to be appreciated that as an alternative to the arrangement described above in which each of the windings 16 to be connected to a particular segment 14 is located in the slot 15 in the segment, it is possible to shorten one of the windings and then, after electrically connecting the shortened winding to the longer winding, for example by resistance welding, located only the longer winding in the slot in the segment. Also, although in the example described, the pair of electrodes 26 used to effect each joining operation are engaged with alternate segments 14, the number of intervening segments between the electrodes is immaterial. In fact, the electrodes 26 could have been engaged with adjacent segments, provided the relative sizes of the commutator and the electrodes permitted this arrangement. Similarly, the electrodes could have been engaged with diametrically opposed, or substantially diametrically opposed segments.

As a further modification to the example described above, one or each of the electrodes 26 can be arranged to taper from a maximum diameter at its end adjacent the welding machine to a minimum diameter at its free end and in fact improved electrode life has been obtained by using tapered electrodes. In one practical embodiment, each electrode 26 was arranged to taper from a maximum diameter of ¼ inch to a minimum diameter of 3/16 inch at its free end, the taper being straight-sided with an included angle of 45°.

Further, it is to be understood that, although the welding electrodes 26 employed in the above example are of circular cross-section, other cross-sections (e.g. rectangular) could be used.

I claim:

1. A method of manufacturing a rotor assembly for a dynamo electric machine comprising the steps of:
   a. stamping an annular conductive disc to produce in one face thereof a plurality of angularly spaced, generally radial grooves which divide the disc into conductive segments and which have a depth greater than the thickness of the disc so that corresponding ribs are formed on the other face of the disc,
   b. moulding an insulating body on said one face of the disc so that the grooves are filled with insulating material,
   c. forming a slot in each of the conductive segments defined between pairs of adjacent grooves,
   d. engaging one end of at least one of a respective pair of rotor windings of the dynamo electric machine in each of the slots in the conductive segments,
   e. resistance joining the ends of the rotor windings received in the slots of at least two conductive segments to their respective segements by using at least two electrodes to pass an electric current through the windings, the segments and the at least one rib defined between the segments, each electrode engaging at least one of the components defined by one of said segments and the windings associated with said one segment, and
   f. machining said other face of the disc to remove said ribs and thereby separate the conductive segments from one another.

2. A method as claimed in claim 1 wherein when the electrodes contact the conductive segments without contacting at least one of the windings in each of the slots, the windings are located against movement in the slots prior to the resistance joining operation.

3. A method as claimed in claim 2 wherein the windings are located against movement in the slots by deformation of the walls of the slots to key the windings in position.

4. A method as claimed in claim 1 wherein step (*b*) is performed before steps (*c*), (*d*), (*e*) and (*f*).

5. A method as claimed in claim 1 wherein step (*b*) is performed after steps (*c*), (*d*) and (*e*) but before step (*f*).

6. A method as claimed in any claim 1 wherein the resistance joining operation is performed successively for each set of at least two conductive segments.

7. A method as claimed in claim 1 wherein the resistance joining operation is performed simultaneously for all the segments.

* * * * *